United States Patent
Klamer

(10) Patent No.: US 7,084,751 B2
(45) Date of Patent: Aug. 1, 2006

(54) SYSTEM AND METHOD OF FACILITATING TRAINING OF A TIRE PRESSURE MONITORING SYSTEM ON A VEHICLE

(75) Inventor: Douglas W. Klamer, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 75 days.

(21) Appl. No.: 10/693,139

(22) Filed: Oct. 24, 2003

(65) Prior Publication Data

US 2004/0140887 A1 Jul. 22, 2004

Related U.S. Application Data

(60) Provisional application No. 60/421,356, filed on Oct. 25, 2002.

(51) Int. Cl.
*G08B 29/00* (2006.01)

(52) U.S. Cl. ............... 340/514; 340/442; 340/445; 340/446; 340/448; 73/146.2; 73/146.5

(58) Field of Classification Search ......... 340/514, 340/442, 445, 446, 447, 448, 426.33; 73/146; 116/34 A, 34 B, 34 R; 152/152.1, 116
See application file for complete search history.

(56) References Cited

U.S. PATENT DOCUMENTS

| 6,243,007 B1 * | 6/2001 | McLaughlin et al. ....... 340/447 |
| 6,612,165 B1 * | 9/2003 | Juzswik et al. ............ 73/146.5 |
| 2003/0030553 A1 * | 2/2003 | Schofield et al. .......... 340/442 |
| 2003/0080860 A1 * | 5/2003 | Stewart et al. ............ 340/442 |
| 2003/0234723 A1 * | 12/2003 | Lin ............................ 340/447 |
| 2004/0041698 A1 * | 3/2004 | Lin ............................ 340/447 |

FOREIGN PATENT DOCUMENTS

| EP | 1136286 | 9/2001 |
| GB | 2344232 | 5/2000 |

* cited by examiner

Primary Examiner—Tai T. Nguyen
(74) Attorney, Agent, or Firm—Foley & Lardner LLP

(57) ABSTRACT

A system for facilitating training of a tire pressure monitoring system on a vehicle by providing an indication to the exterior of the vehicle. The system includes a receiver circuit configured to detect a wireless message including a tire sensor identifier, a memory configured to receive and store a number of tire sensor identifiers, at least one external indicator on the vehicle configured to provide an indication to the exterior of the vehicle, and a control circuit configured to provide a control signal to the external indicator on the vehicle to indicate to a user to actuate a tire sensor transmitter.

23 Claims, 2 Drawing Sheets

SYSTEM AND METHOD OF FACILITATING TRAINING OF A TIRE PRESSURE MONITORING SYSTEM ON A VEHICLE

CROSS REFERENCE TO RELATED APPLICATIONS

This application claims the benefit of U.S. Provisional Patent Application No. 60/421,356, filed Oct. 25, 2002.

BACKGROUND

Vehicles are increasingly incorporating tire pressure monitoring systems. Tire pressure monitoring systems are systems configured to receive messages from sensors associated with each tire on a vehicle. The sensors are configured to detect characteristics of the associated tire such as tire pressure, temperature, wear, etc. The detected characteristics are communicated in the message to the tire pressure monitoring system for analysis and communication to a user.

In most tire pressure monitoring systems, each sensor is associated with a specific identifier. The specific identifier is included in all messages transmitted from that sensor so that the tire pressure monitoring system can determine the origin of the message. Identification is necessary because messages are often transmitted wirelessly and it is difficult to detect the origin of the message without the specific identifier. The origin is important because messages may be received from sensors other than those associated with tires on the vehicle. For example, a wireless message may be received from a tire sensor on a vehicle parked next to the intended vehicle.

Accordingly, it may be desirable to configure the tire pressure monitoring system to recognize the identifiers for the tires on the vehicle. Further, the tire pressure monitoring system may be configured to recognize not only the identifiers for tires on the vehicle, but also their location on the vehicle. Accordingly, it may also be desirable to configure the tire pressure monitoring system to recognize a location for each identifier.

However, configuring the tire pressure monitoring system to recognize the identifiers and/or their location may be a difficult task. In training the system, a user is often required to check a display mounted inside a vehicle to find out which tire is to be trained. The user then forces the sensor for that tire to transmit its identifier by standing next to the tire and actuating the sensor to transmit. The user must then go into the vehicle and check the display to determine whether the training was successful. If not, the user must again return to the sensor to actuate transmission from the sensor again and repeat the process. Further, this process must be repeated for each tire to be trained.

Accordingly, what is needed is a tire pressure monitoring system configured to provide an external indication to a user indicating which tire is to be trained. What is further needed is such a tire pressure monitoring system configured to provide an external indication whether training was successful. The teachings hereinbelow extend to those embodiments which fall within the scope of the detailed description, regardless of whether they accomplish one or more of the above-mentioned needs.

SUMMARY

According to an exemplary embodiment, a system for facilitating training of a tire pressure monitoring system on a vehicle by providing an indication to the exterior of the vehicle. The system includes a receiver circuit configured to detect a wireless message including a tire sensor identifier, a memory configured to receive and store a number of tire sensor identifiers, at least one external indicator on the vehicle configured to provide an indication to the exterior of the vehicle, and a control circuit configured to provide a control signal to the external indicator on the vehicle to indicate to a user to actuate a tire sensor transmitter.

According to another exemplary embodiment, a method for indicating a tire to be trained using an external indicator on a vehicle. The method includes indicating a tire to be trained using the external indicator on the vehicle, receiving a wireless message including a tire sensor identifier from a transmitter associated with the tire to be trained, and storing the tire sensor identifier from the tire to be trained.

According to yet another exemplary embodiment, a system for facilitating training of a tire pressure monitoring system on a vehicle by providing an indication of a tire to be trained to the exterior of the vehicle. The system includes means for providing an external indication on the vehicle to indicate the tire to be trained, means for receiving a wireless message including a tire sensor identifier from a transmitter associated with the tire to be trained, and means for storing the tire sensor identifier from the tire to be trained.

BRIEF DESCRIPTION OF THE DRAWINGS

The invention will become more fully understood from the following detailed description of exemplary embodiments, taken in conjunction with the accompanying drawings, wherein like reference numerals refer to like parts, and in which.

DETAILED DESCRIPTION OF EXEMPLARY EMBODIMENTS

Figure 1:
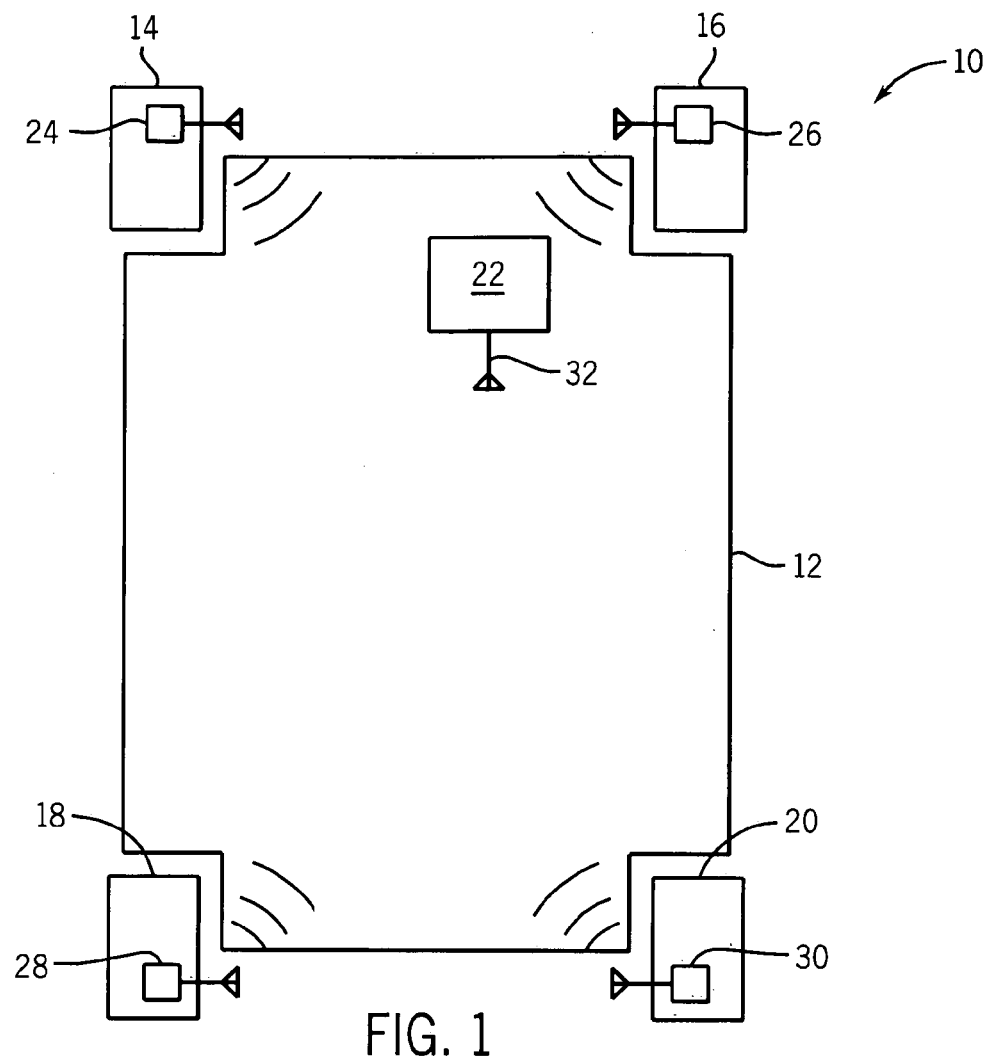
FIG. 1 is a schematic diagram of a tire monitoring system having a system and method for facilitating recognition of tire sensor identifiers on a vehicle, according to an exemplary embodiment.

Referring first to FIG. 1, a tire monitoring system 10 is illustrated on a vehicle 12. Tire monitoring system 10 is configured to monitor one or more characteristics of one or more tires 14, 16, 18, 20, such as, tire pressure, temperature, alignment, tread wear, etc. Tire monitoring system 10 is a wireless system, which utilizes radio frequency, infrared, or other wireless signal transmission technology to provide tire characteristic data from tires 14–20 to a tire monitor 22. Thus, tire monitoring system 10 includes a plurality of tire sensors 24, 26, 28, 30, each coupled to one of tires 14-20. Tire sensors 24–30 are configured to sense one or more characteristics of tires 14–20, respectively, and to provide tire characteristic data wirelessly to tire monitor 22.

Tire monitor 22 includes a single antenna 32 in this exemplary embodiment for receiving wireless messages from one or more of tire sensors 24–30. In alternative embodiments, multiple antennas may be coupled to tire monitor 22 for receiving wireless messages at a plurality of locations on vehicle 12. For example, tire monitor 22 may include four antennas, one disposed in the vicinity of each of tire sensors 24–30.

Tire monitor 22 is configured to receive wireless messages from one or more of tire sensors 24–30, to monitor the tire characteristic data on the wireless messages, and to selectively display tire characteristic data to an operator of vehicle 12. For example, tire monitor 22 may receive tire pressure data from tire sensors 24–30 and may monitor the tire pressure data to determine if the tire pressure of any of tires 14–20 is greater than or less than predetermined maximum and/or minimum thresholds and may provide a display and associated alarm (visible, audible, etc.) to the operator of vehicle 12 in the vehicle interior. The alarm indicates to the operator that maintenance of the tire causing the alarm may be needed.

Each of tire sensors 24–30 is configured to transmit tire sensor identifier signals (IDs) or tire identification data, which may be any type of message uniquely identifying the tire. For example, a tire identification of "000f", in hexadecimal representation, may indicate a first tire, while a tire identification of "01af" may identify a second tire. Tire monitor 22 may be configured to receive the tire identification data on the wireless message and to identify a location of the tire on vehicle 12, to provide more meaningful tire data to the operator of vehicle 12. For example, tire monitor 22 may associate a tire identification of "000f" with the vehicle position of "left front", and display the tire pressure data associated with tire "000f" along with a display indicating that the tire is the left front tire, such as, "LF 28". In this manner, useful information can be provided to the operator of vehicle 12 to determine alarm conditions, such as, "LF LOW", "RR LOW", etc.

Vehicle 12 further includes external indicators 37. (Shown in FIG. 2) External indicators 37 can include turn signals, head lights, break lights, the vehicle horn, or any other system coupled to a vehicle or vehicle exterior element (e.g., bumper, side panel, hood, etc.) that can be used to provide a signal or indication to a person standing outside a vehicle. External indicators 37 can be controlled by sending a control signal over the vehicle communication bus to actuate the external indicator. For example, a control signal can be sent over a vehicle communication bus to flash the right-front turn signal. According to an alternative embodiment, external indicators can receive control signals without being connected or controlled through the vehicle communication bus.

Figure 2:
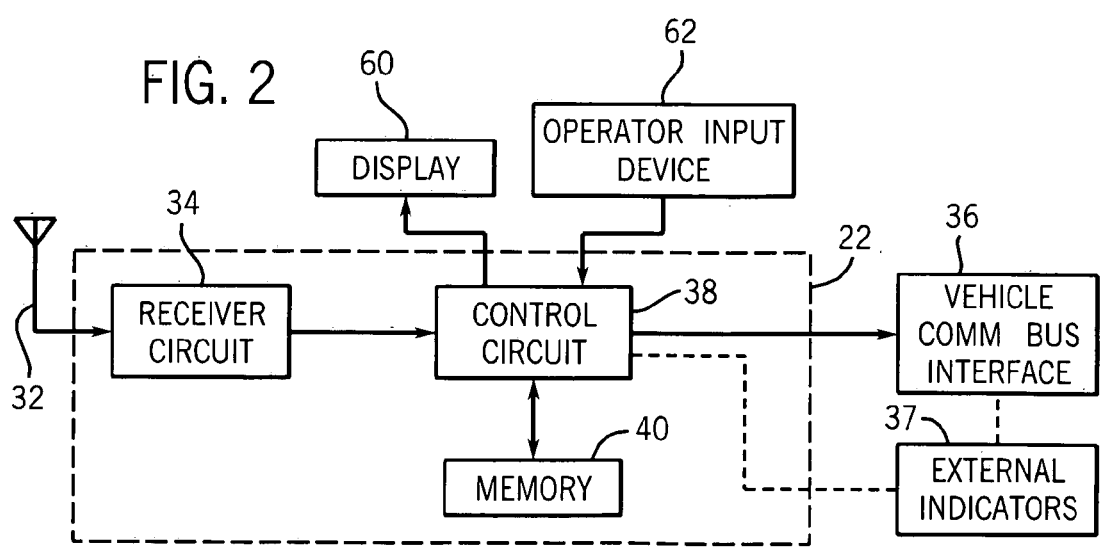
FIG. 2 is a block diagram of the system for facilitating recognition of tire sensor identifiers on the vehicle of FIG. 1, according to an exemplary embodiment.

Referring now to FIG. 2, a block diagram of tire monitoring system 22 is illustrated according to an exemplary embodiment. Tire monitoring system 22 includes a receiver circuit 34, a vehicle communication bus interface 36, a control circuit 38, and a memory 40. Circuits 34 and 38, interface 36, and memory 40 are illustrated in block form to indicate that these elements are functional units which may be embodied in hardware circuitry, software, or other processing elements. For example, circuits 34 and 38, interface 36 and memory 40 may be disposed on one or more integrated circuits, and may be part of a system-on-chip (SOC), and may further include programmable logic, microprocessors, microcontrollers, or other control circuitry. Furthermore, memory 40 may include volatile memory portions and non-volatile memory portions, and may include random access memory, read-only memory, and/or other memory types.

Receiver circuit 34 is configured to receive wireless messages via antenna 32 from tire sensors 24–30. Tire sensors 24–30 are configured to transmit blocks of wireless messages, each block including eight identical frames of data, in this exemplary embodiment. Due to interference, multipath, and other sources of error, tire sensors 24–30 send duplicative data in each of the frames of each block. Tire sensors 24–30 are configured to transmit blocks of data periodically, wherein the rate of transmissions is greater when the vehicle is in motion than when the vehicle is idle. For example, when the vehicle is in motion, a block of data may be sent from each of tire sensors 24–30 at a rate of one transmission per 60 seconds, and when vehicle 12 is idle, tire sensors 24–30 are each configured to send a block of data at a rate of one transmission per 60 minutes. Receiver circuit 34 may include amplifying circuitry, filtering circuitry, buffering circuitry, demodulating circuitry, and/or other circuit elements necessary to receive wireless messages from tire sensors 24–30 via antenna 32.

Control circuit 38 is coupled to receiver circuit 34 and is configured to store the transmitter IDs provided by receiver circuit 34 in memory 40. Control circuit 38 is configured to control the various portions of system 22, to store data in memory, to operate preprogrammed functionality, etc. Control circuit 38 may include various types of control circuitry, digital and/or analog, and may include a microprocessor, microcontroller, application-specific integrated circuit (ASIC), or other circuitry configured to perform various input/output, control, analysis, and other functions to be described herein.

Control circuit 38 is coupled to an operator input device 62 which includes one or more push button switches but may alternatively include other user input devices, such as, switches, knobs, dials, etc., or even a voice-actuated input control circuit configured to receive voice signals from a vehicle occupant and to provide such signals to control circuit 38 for control of system 22.

Control circuit 38 is further coupled to a display 60 which includes a liquid crystal display (LCD). Display 60 may alternatively include other display elements, such as a light-emitting diodes (LED), a vacuum florescent display (VFD), or other display elements.

Control circuit 38 is further coupled to a vehicle communication bus interface 36 configured to allow control circuit 38 to transmit control signals over the vehicle communication bus to external indicators on a vehicle. The vehicle communication bus can be any type of communication bus, such as, a bus following the J1850 communication protocol, a serial or parallel data bus, a digital or analog data bus, etc. According to an alternative embodiment, control circuit 38 can be coupled to external indicators 37 on a vehicle without using the vehicle communication bus or wirelessly (e.g., via radio frequency, infrared, etc.).

Figure 3:
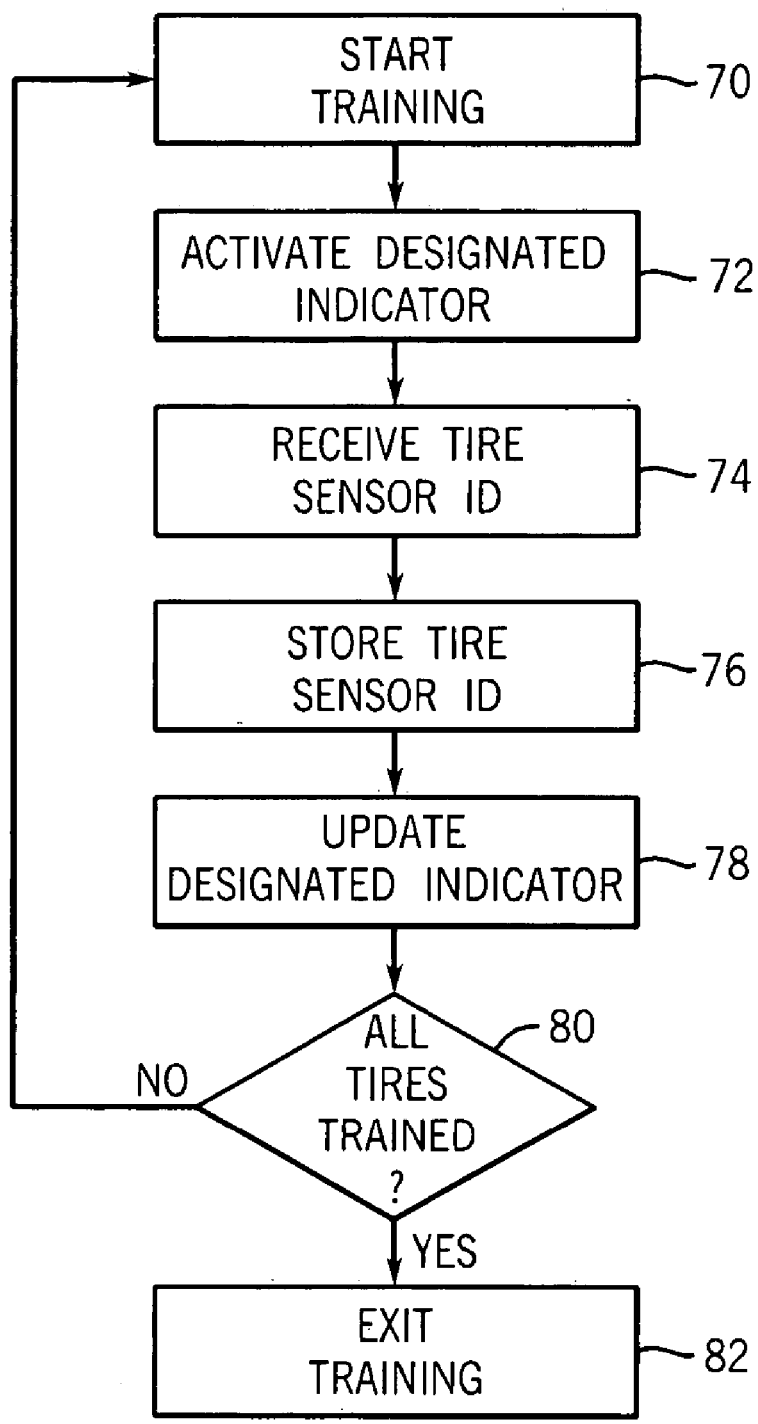
FIG. 3 is a flowchart illustrating a method for facilitating recognition of tire sensor identifiers on the vehicle of FIG. 1.

Referring to FIG. 3, an exemplary method of facilitating training of a tire pressure monitoring system on a vehicle is described. It is understood that one or more of the steps in this exemplary method may be eliminated or rearranged in various embodiments.

According to this exemplary embodiment, training includes storing an identifier for a designated tire location in memory. According to alternative embodiments, training can include a method performed by a user, a process performed by the control circuit, a method including recording identifiers for all tires on a vehicle, or any other method to recognize tires on a vehicle.

At step 70, control circuit 38 identifies whether the user has requested system 22 to enter a training mode to begin training. For example, the user may hold down one, two, or more devices of operator input device 62 for a predetermined time period (e.g., 10 seconds, 20 seconds, etc.) to place control circuit 38 in a training mode, or the user may actuate a separate input device coupled to control circuit 38 (FIG. 2) to place system 22 in the training mode.

Once training has begun, at step 72, control circuit 38 will initialize training for a tire location. A first tire location can be chosen from the tire locations in a logical order such as right-front, left-front, left-rear, right-rear. Control circuit 38 is configured to send a control message through vehicle communication bus interface 36 to cause an external indicator in proximity with the first tire location to actuate. For example, where the right-front is the first location, control circuit 38 can send a control signal to cause the right-front turn signal to start flashing. According to alternative embodiments, the right front headlight, parking light, brake lights (for rear tire locations), etc. can be activated.

According to yet another embodiment, a vehicle horn can be activated to provide an indication to a user. According to this embodiment, the user could be required to train the tire locations in a specified order, and the vehicle horn would be used to indicate a successful training at each location such that the user can progress to the next tire location. According to an alternative embodiment, a single horn beep could be used to indicate a right-front tire location, two horn beeps to indicate a left-front tire location, etc.

Once the external indicator has been activated, control circuit 38 waits to receive a tire pressure monitor identifier signal from the tire sensor at the designated location at step 74. According to an exemplary embodiment, this signal can be sent as a result of a manual training operation by the user. In this embodiment, the user goes to the tire location indicated by the external indicator and holds an actuation device in close proximity to the tire at the designated location. The actuation device causes the tire sensor to begin transmitting a tire pressure monitor identifier signal. The actuation device can include a magnet where the tire sensor includes a magnetic switch, a transponder where the tire sensor includes a receiver, a button or switch coupled to the tire sensor, or any other device or mechanism which will force the tire pressure sensor to begin transmitting.

At step 76, control circuit 38 receives the tire sensor identifier signal and retrieves the identifier for the tire for the designated tire location. The identifier can be stored in memory 40 in a location associated with the designated tire location.

At step 78, after correctly receiving and storing the tire sensor identifier signal, the designated location can be incremented to indicate a next tire location. Following the update of the designated location, a determination can be made in a step 80 whether all the tires have been successfully trained, and if so, the system can end training in step 82. If all of the tires have not been successfully trained, step 72 can be repeated using the updated designated tire location. The external indicator at the first designation location will cease and the external indicator at the second designated location will activate. This will notify the user that the tire at the first designated location was successfully trained and that the user can progress to the second designation location to train the tire at that location.

Flashing an external indicator allows control circuit 38 to indicate to a user which tire needs to be trained and also when the tire has been successfully trained. Providing feedback to a user externally provides the benefit of not requiring that the user enter the vehicle to view display 60 in between each tire training. Accordingly, as each tire is trained, the user can walk directly to the next tire in the sequence as directed by the external indicators. By directing the user to the appropriate tire by using the external indicator, the tire training process is less confusing, more simple, quicker, and less frustrating.

While the exemplary embodiments illustrated in the FIGURES and described above are presently preferred, it should be understood that these embodiments are offered by way of example only. For example, various techniques for comparing detected tire sensor identifier signals with stored identifiers may be used. Further, the teachings herein may be applied to various types of vehicles, including cars, trucks, all-terrain vehicles, construction vehicles, etc. Accordingly, the present invention is not limited to a particular embodiment, but extends to various modifications that nevertheless fall within the scope of the appended claim.

What is claimed is:

1. A system for facilitating training of a tire pressure monitoring system on a vehicle by providing an indication to the exterior of the vehicle, comprising:
   a receiver circuit configured to detect a wireless message including a tire sensor identifier;
   a memory configured to receive and store a number of tire sensor identifiers;
   at least one external indicator on the vehicle configured to provide an indication to the exterior of the vehicle; and
   a control circuit configured to provide a control signal to the external indicator on the vehicle to indicate to a user to actuate a tire sensor transmitter.

2. The system of claim 1, wherein the external indicator is a vehicle turn signal lamp.

3. The system of claim 1, wherein the external indicator is a vehicle horn.

4. The system of claim 1, wherein the receiver circuit is configured to receive the tire sensor identifier and wherein the control circuit is configured to store the received tire sensor identifier and to provide a second control signal to a second external indicator following successful storage of the received tire sensor identifier.

5. The system of claim 1, wherein the control circuit is further configured to select a location on the vehicle of a tire sensor and to provide the control signal to an external indicator in proximity to the selected location.

6. The system of claim 5, wherein the external indicator is a vehicle turn signal lamp.

7. The system of claim 5, wherein the control circuit is further configured to store the selected location and the received tire sensor identifier in memory.

8. The system of claim 7, wherein the control circuit is configured to provide a second control signal to a second external indicator following successful storage of the selected location and received sensor identifier.

9. A method for indicating a tire to be trained using an external indicator on a vehicle, comprising:
   indicating to a user to actuate a tire sensor transmitter for a tire to be trained using the external indicator on the vehicle;
   receiving a wireless message including a tire sensor identifier from a transmitter associated with the tire to be trained; and
   storing the tire sensor identifier from the tire to be trained.

10. The method of claim 9, wherein indicating a tire to be trained includes indicating a tire anywhere on the vehicle.

11. The method of claim 9, wherein indicating a tire to be trained includes indicating a tire in a specific location on the vehicle.

12. The method of claim 9, wherein the external indicator is a vehicle turn signal lamp.

13. The method of claim 9, wherein the external indicator is a vehicle horn.

14. The method of claim 9, further including indicating successful storage of the sensor identifier using the external indicator.

15. The method of claim 9, further including indicating successful storage of the sensor identifier using a second external indicator.

16. A system for facilitating training of a tire pressure monitoring system on a vehicle by providing an indication of a tire to be trained to the exterior of the vehicle, comprising:

means for providing an external indication on the vehicle to indicate to a user to actuate a tire sensor transmitter for the tire to be trained;

means for receiving a wireless message including a tire sensor identifier from a transmitter associated with the tire to be trained; and means for storing the tire sensor identifier from the tire to be trained.

17. The system of claim 16, wherein the means for providing an external indication is a vehicle turn signal.

18. The system of claim 16, wherein the means for providing an external indication is a vehicle horn.

19. The system of claim 16, wherein the means for providing an external indication is configured to provide a second external indication following successful storage of the tire sensor identifier.

20. The system of claim 16, wherein the means for providing an external indication is further configured to select a location on the vehicle of a tire to be trained and to provide the external indication in proximity to the selected location.

21. The system of claim 20, wherein the means for providing an external indication is a vehicle turn signal lamp.

22. The system of claim 21, wherein the means for storing the tire sensor identifier is further configured to store the selected location and the received tire sensor identifier in memory.

23. The system of claim 22, wherein the means for providing an external indication is configured to provide a second external indication following successful storage of the selected location and the received tire sensor identifier.

\* \* \* \* \*